(12) United States Patent
Rainer

(10) Patent No.: US 6,446,786 B1
(45) Date of Patent: Sep. 10, 2002

(54) CENTERING DEVICE FOR CONVEYED MATERIAL

(75) Inventor: Massow Rainer, Schloss Holte-Stukenbrock (DE)

(73) Assignee: Wilfried Strothmann GmbH & Co. KG, Maschinebau und Handhabungstechnik, Schloss Holte-Stukenbrock (DE)

( * ) Notice: Subject to any disclaimer, the term of this patent is extended or adjusted under 35 U.S.C. 154(b) by 0 days.

(21) Appl. No.: 09/991,624

(22) Filed: Nov. 6, 2001

(30) Foreign Application Priority Data

Nov. 29, 2000 (DE) .......................................... 100 59 312

(51) Int. Cl.⁷ ............................................. B65G 47/26
(52) U.S. Cl. ..................................................... 198/456
(58) Field of Search .............................. 198/456, 597, 198/457.06, 411, 416

(56) References Cited

U.S. PATENT DOCUMENTS 4,595,095 A * 6/1986 Dyer .......................... 198/456
4,895,244 A * 1/1990 Flaugher et sl. ........ 198/456 X
5,368,643 A * 11/1994 Kuster ..................... 198/456 X
5,605,215 A * 2/1997 Gross et al. ............ 198/456 X
6,098,791 A * 8/2000 Minnerop ............... 198/597 X

FOREIGN PATENT DOCUMENTS

SU 1611813 * 12/1990 .................. 198/456

* cited by examiner

Primary Examiner—James R. Bidwell
(74) Attorney, Agent, or Firm—Richard M. Goldberg

(57) ABSTRACT

A centering device for material conveyed on a conveyor system includes pusher elements disposed on both sides of the conveyor system such that they can be moved to and fro in the direction of the center line of the conveyor system, the pusher elements each including at least two stoppers which can be moved along parallel guide components oriented towards the center line, the stoppers being connected with one and the same endless traction element such that they are driven in the same direction, with the traction element being threaded to and fro around the guide components.

17 Claims, 4 Drawing Sheets

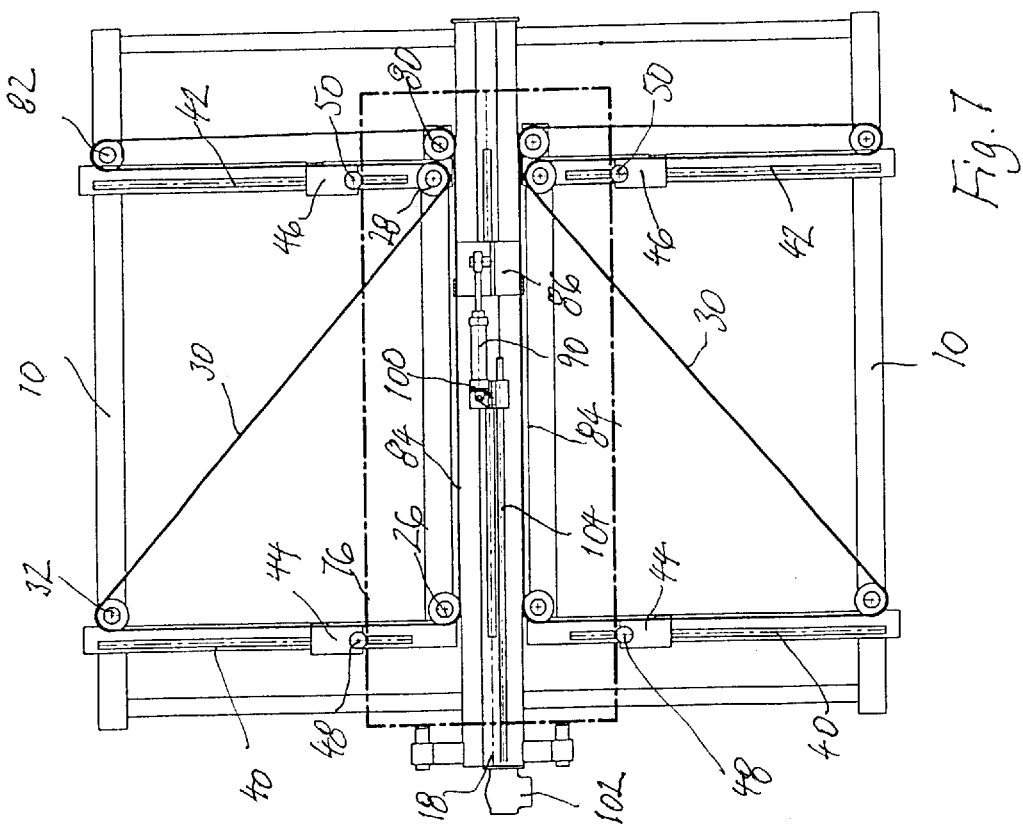
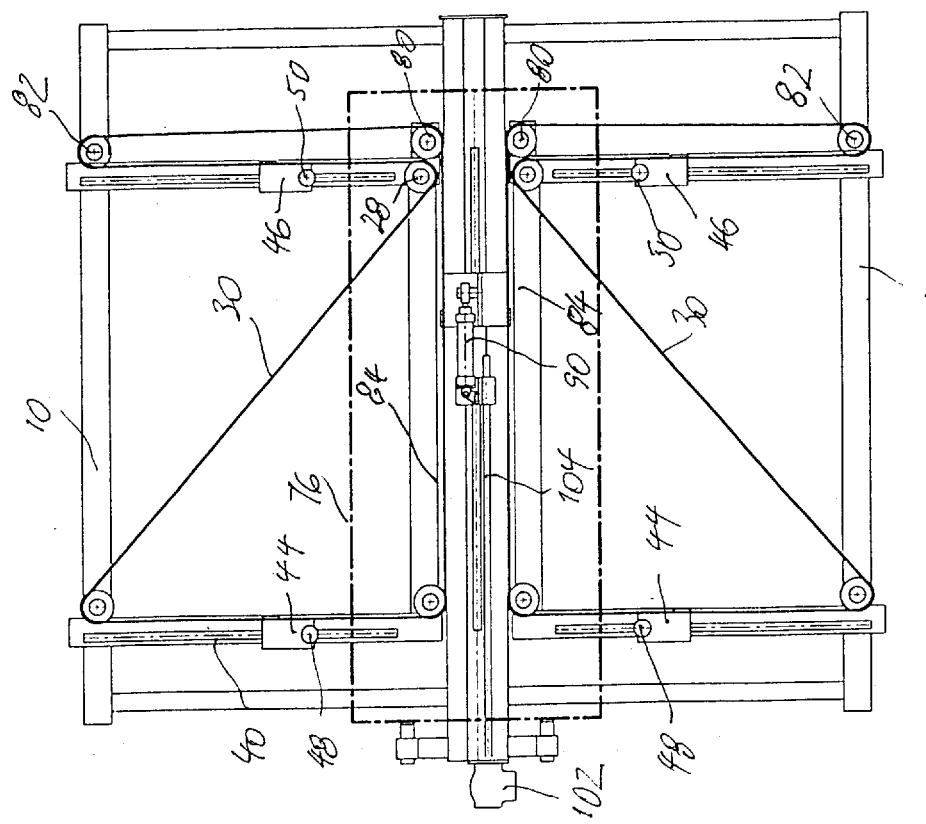

CENTERING DEVICE FOR CONVEYED MATERIAL

BACKGROUND OF THE INVENTION

This invention relates to a centering device for material conveyed on conveyor systems with pusher elements disposed on both sides of the conveyor system such that they can be moved to and fro towards the direction of the center line of the conveyor system.

Various prior art embodiments of centering devices of this type already exist. During the automatic, or largely automatic processing of workpieces such as e.g. sheet metal, timber boards, profiles or bars, the latter are usually transported up to a processing station on a conveyor system. In doing so, it is often necessary to ensure that the workpieces are more or less accurately centered in relation to the processing station. In these cases, use is made of the type of centering device in question here, i.e. anything from simple lateral guide boards to complicated constructions which are both complex and expensive.

SUMMARY OF THE INVENTION

This invention is based on the task of providing a centering device of the above kind, which, whilst being of a simple construction, also ensures a high degree of accuracy and operating reliability.

According to the invention, this task is solved with a centering device of the above-mentioned type in that the pusher elements each comprise at least two stoppers which can be moved along parallel guide components oriented towards the center line, said stoppers each being connected with one and the same endless traction element in such a way that they are driven in the same direction.

The traction element may be e.g. a toothed belt. This toothed belt is threaded to and fro around the two guide components in such a way that the two pusher elements can each be connected with two strands of the toothed belt which are moved in the same direction. Outside the working area, this toothed belt is threaded from the one guide component to the other, where it is also arranged to run to and fro in two strands. The toothed belt only requires a single drive, which moves both stoppers in the same direction.

In certain cases it may suffice to be able to push the workpiece towards the center from one side only. In other cases, however, it may be necessary to provide mirror-inverted centering devices on both opposite sides of the conveyor system.

Whilst a first embodiment of the invention with two mirror-inverted pusher elements provides for each pusher element to have its own drive, with the drives being synchronized via a common control unit, in a second embodiment of the invention the movement of the two pusher elements is provided by one and the same drive. For this purpose the two traction elements of both pusher elements can be threaded parallel to each other along a pre-defined portion and be connected here to a common slide which synchronizes the movement of the traction elements.

The drive or drives are associated with control units into which all that has to be entered is the width of the workpieces to be centered. This then allows a simple calculation of how far the stoppers have to be pushed in towards the middle.

Two stoppers disposed behind each other on the two guide components in the direction of conveyance prevent the workpieces to be centered from moving out of line. When centering flexible objects, e.g. bars, it may be necessary to provide three or more guide components with stoppers on both sides of the conveyor system.

The drive for the traction element may be a cylinder, a pneumatic cylinder for example, which is pushed forwards in line with the width of the objects into a specific position on one of the guide components from where, through its movement, it in turn moves the traction element to and fro. For this purpose the end of the piston rod of the cylinder, for example, can be rigidly connected to the corresponding guide component via one strand of the traction element. When the piston rod is extended, this strand is pulled forwards in the centering direction, with exactly the same happening to the corresponding strand on the other guide component. To adjust the starting position of the cylinder there can be a motor with a spindle, for example, which engages in a spindle nut on the cylinder housing.

This spindle nut can in turn be displaceably mounted together with the cylinder on the corresponding guide component.

The use of a simple pneumatic cylinder for the stoppers intended to push the workpieces towards the center is particularly advantageous as this is a very simple solution. The cylinder movement does not vary, so all that has to be done is move the cylinder housing into a predefined position in line with the width of the workpieces.

BRIEF DESCRIPTION OF THE DRAWINGS

Preferred embodiments of the invention will now be described in more detail below with reference to the enclosed drawings, in which:

FIG. 6 and 7 are diagrammatic top plan views of another embodiment of the invention in two different operating positions.

DETAILED DESCRIPTION

Figure 1:
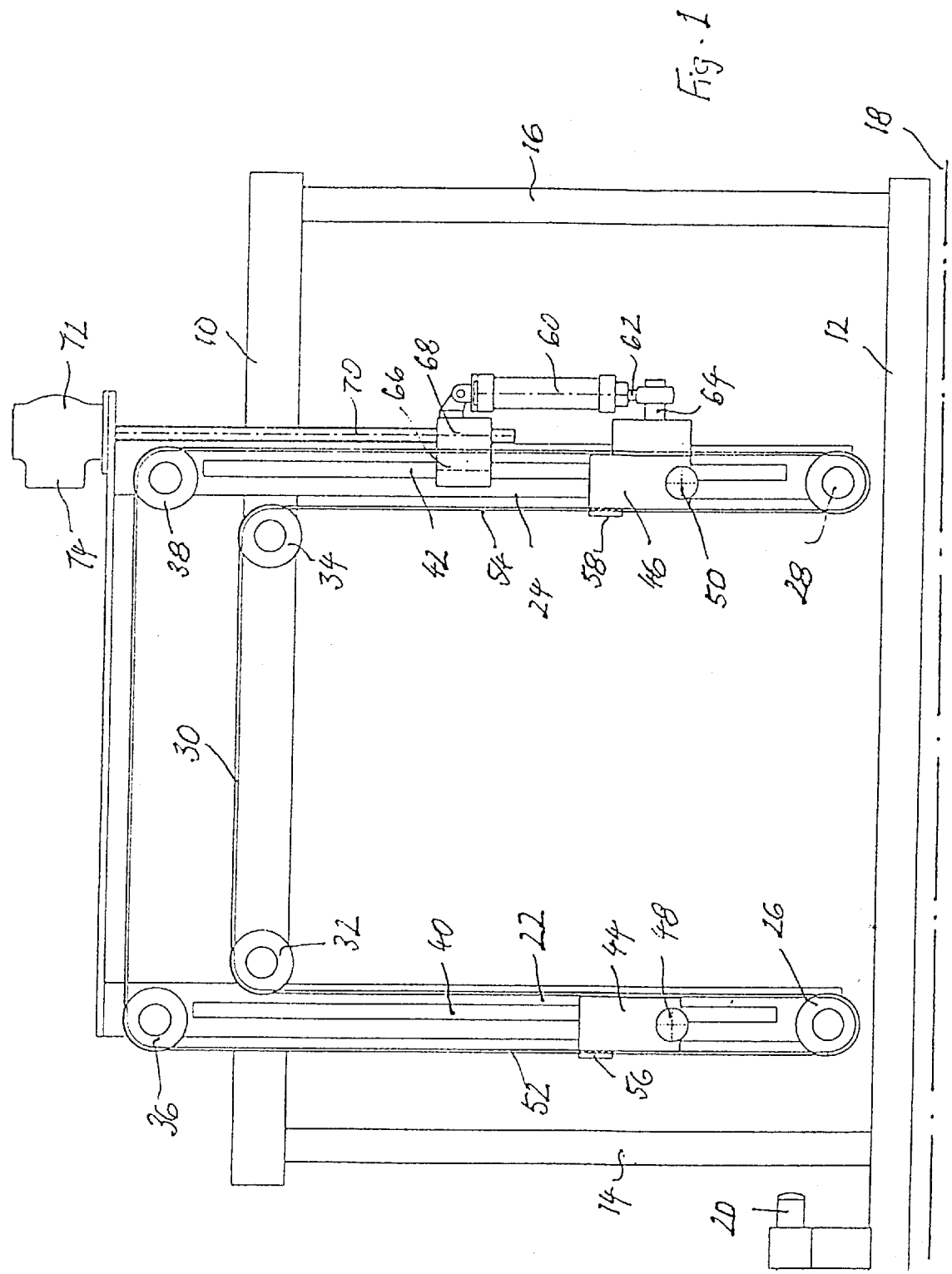
FIG. 1 is a diagrammatic top plan view of an embodiment of a centering device according to the invention for one side of a conveyor system.

Numerals 10,12,14,16 of FIG. 1 designate the frame parts of a conveyor table which is only shown in part, on which a conveyor system runs from right to left in FIG. 1. 18 designates the center line of the conveyor system. 20 designates an end stopper which retains the material being conveyed e.g. at the point at which it enters a processing station (not shown).

The centering device has two parallel guide components 22,24 positioned behind each other in the direction of conveyance, which are attached to the frame part 10 of the conveyor table situated in the outer area at a distance from the center line 18, and project in the direction of center line 18. At the free ends of guide components 22,24 there are deflector rollers 26,28 around which runs an endless toothed belt 30, which, in the outer area of the guide components, i.e. towards the top of FIG. 1, runs around two deflector rollers 32,34 attached to frame part 10, as well as two deflector rollers 36,38 mounted at the outer ends of guide components 22,24 towards the top of FIG. 1.

The term endless toothed belt is not to be understood literally in this case. The kind of toothed belt suitable for use here is more the type that is finite, but can be assembled as an endless loop. We will refer back to this aspect below.

On guide components 22,24 there are guide tracks 40,42, along which slides 44,46 can be moved in the direction of the guide components. These slides carry stoppers 48,50 at the ends of the slides 44,46 closest to the center line 18, which constitute the stoppers which come into contact with the workpieces, as will be explained in more detail below. Moreover, slides 44,46 are rigidly connected with each left strand 52,54 of endless toothed belt 30 with the aid of clamping plates 56,58. With each movement of endless toothed belt 30 in either direction, slides 44,46 and stoppers 48,50 with them, are moved in the same direction either towards center line 18 or in the opposite direction. This means stoppers 48,50 can be pushed towards center line 18 to maneuver a workpiece (not shown) into a centered position.

As already mentioned, the term endless toothed belt or, expressed more generally, endless traction element, is not to be understood literally in this case. The type of section which could be used here is a finite one which is joined up to form a closed loop. The join can be made in the vicinity of the two clamping plates 56,58 in particular. It is also possible to provide an adjusting device which permits a certain longitudinal displacement of the toothed belt and, therefore, an alignment of the two stoppers 48,50.

To trigger the movement of slides 44,46 there is a pneumatic cylinder 60, whose piston rod 62 is connected with slide 46, which is shown on the right of FIG. 1, via a joint 64. The cylinder of the pneumatic cylinder 60 is attached to an adjusting slide 66, which can also be moved along guide track 42 of the right-hand guide component 24 in FIG. 1. This movement of the adjusting slide serves to bring the pneumatic cylinder into a pre-defined starting position in line with the width of the objects to be centered.

Disposed on adjusting slide 66 for this purpose there is a spindle nut 68 positioned between the actual adjusting slide 66 and the mounting arrangement, which is not designated in more detail, of the cylinder. Spindle nut 68 accommodates a spindle 70 which runs upwards in FIG. 1 parallel to guide component 24, and is connected with a motor 72. This motor 72 is connected with a comparatively simple control unit into which all that has to be entered is the width of the workpieces to be centered, and which uses this width to calculate the desired starting position of pneumatic cylinder 66 and controls motor 72 accordingly.

Once pneumatic cylinder 60 has been brought into its starting position in this way and a workpiece is in the process of being conveyed past the two guide components 22,24, pneumatic cylinder 60 extends the piston rod 62, which pushes slide 46 and, together with the latter and with the aid of toothed belt 30, the other slide 44, too. In this way the two stoppers 48,50 are moved forwards towards the center line 18 and the workpiece is brought into the centered position.

Figure 2:
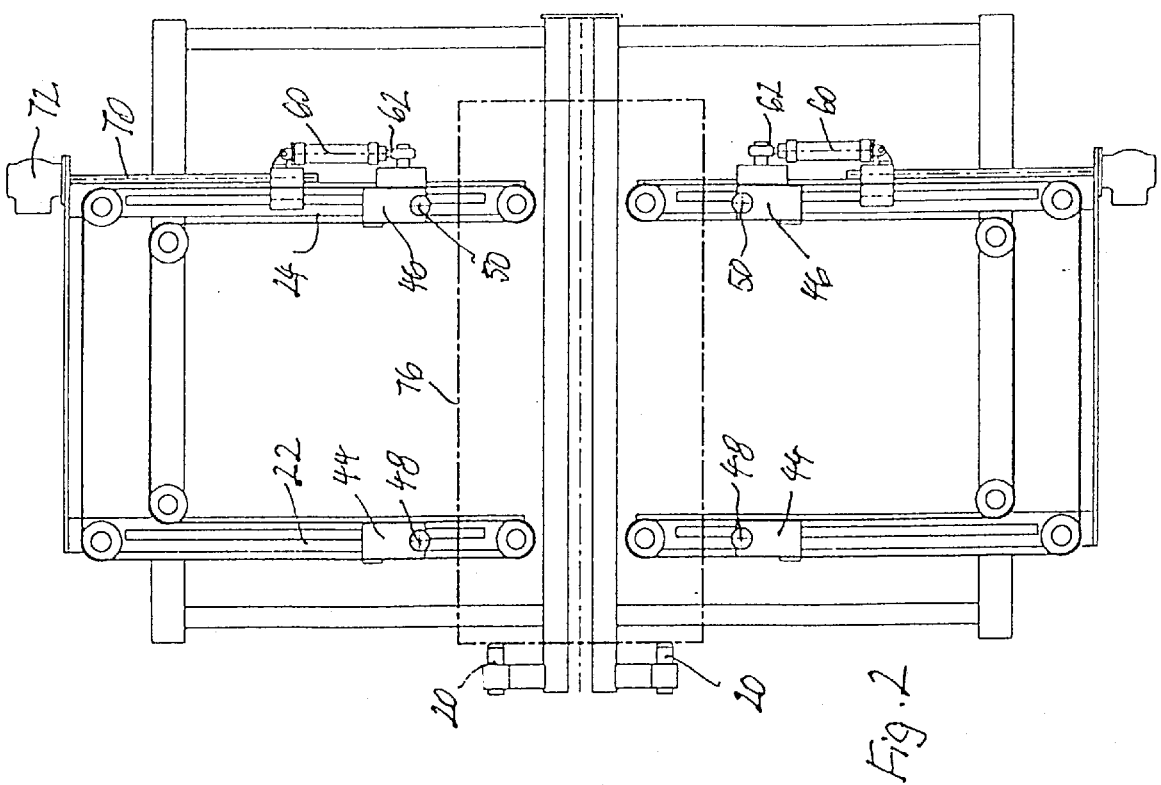
FIG. 2 is a top plan view of the embodiment of FIG. 1 in a double-sided embodiment in a first operating position.

FIG. 2 shows the device of FIG. 1 on a smaller scale and in a double version, i.e. in a mirror-inverted arrangement on both sides of the conveyor system. As the device of FIG. 2 coincides completely with the device shown in FIG. 1 we shall use the same reference numerals and a short explanation to clarify the mode of operation will suffice here.

In FIG. 2, the workpiece to be centered is indicated as a rectangular board shown by a dot-dash line. In FIG. 2 the adjusting slides 66 have already been moved into the required starting positions for pneumatic cylinders 60, but piston rods 62 of the pneumatic cylinders are still in their retracted position. Stoppers 48,50 on the two slides 44,46 are therefore still located at a distance from the side edges of workpiece 76.

Figure 3:
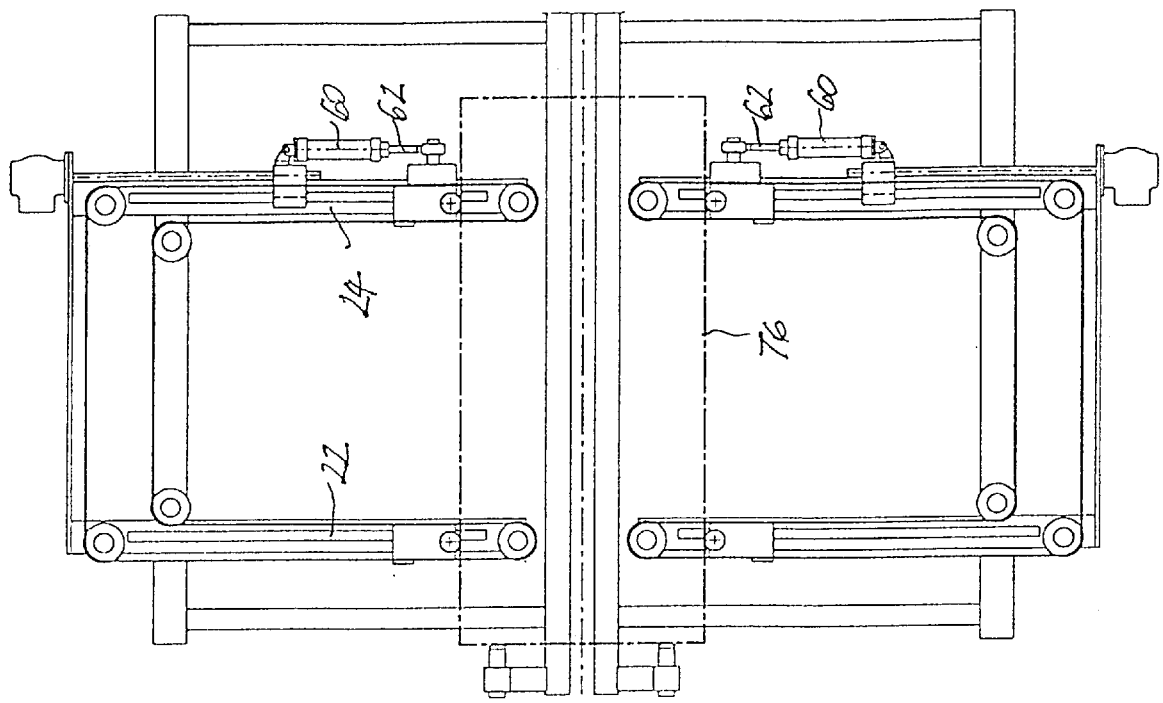
FIG. 3 is a top plan view according to FIG. 2 but shows the device after the centering procedure.

FIG. 3 only differs from FIG. 2 in that in this case, piston rods 62 of pneumatic cylinders 60 are extended. The workpiece has now been moved into its centered position.

If the width of the workpiece is known, all that is required is to enter this value into the control units 74 of the two motors 72 of spindles 70, and to move adjusting cylinders 66 into the required position. No further coordination or synchronization of the oppositely-positioned drives is necessary. Using pneumatic cylinders also eliminates the risk of the workpiece being squashed if it is ever oversized, because the compressible air in the pneumatic cylinders ensures a certain spring action.

Figure 5:
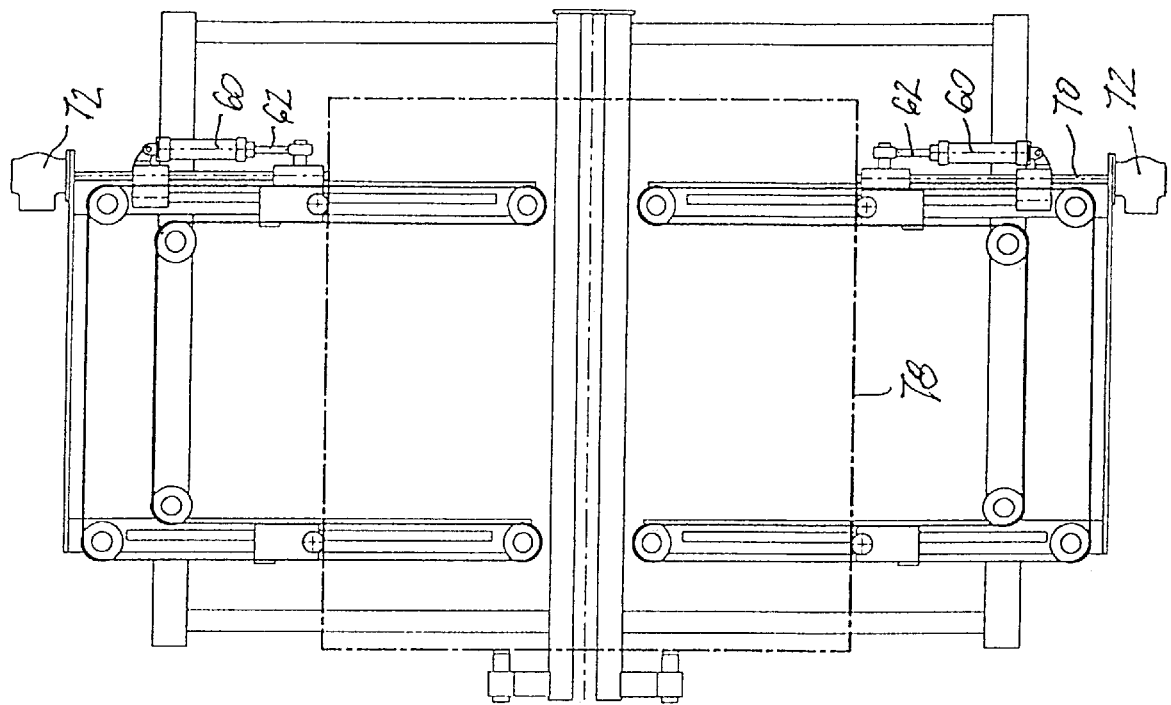
FIG. 4 and 5 correspond to FIGS. 2 and 3, but show the position of the parts with a workpiece of a greater width.
Figure 4:
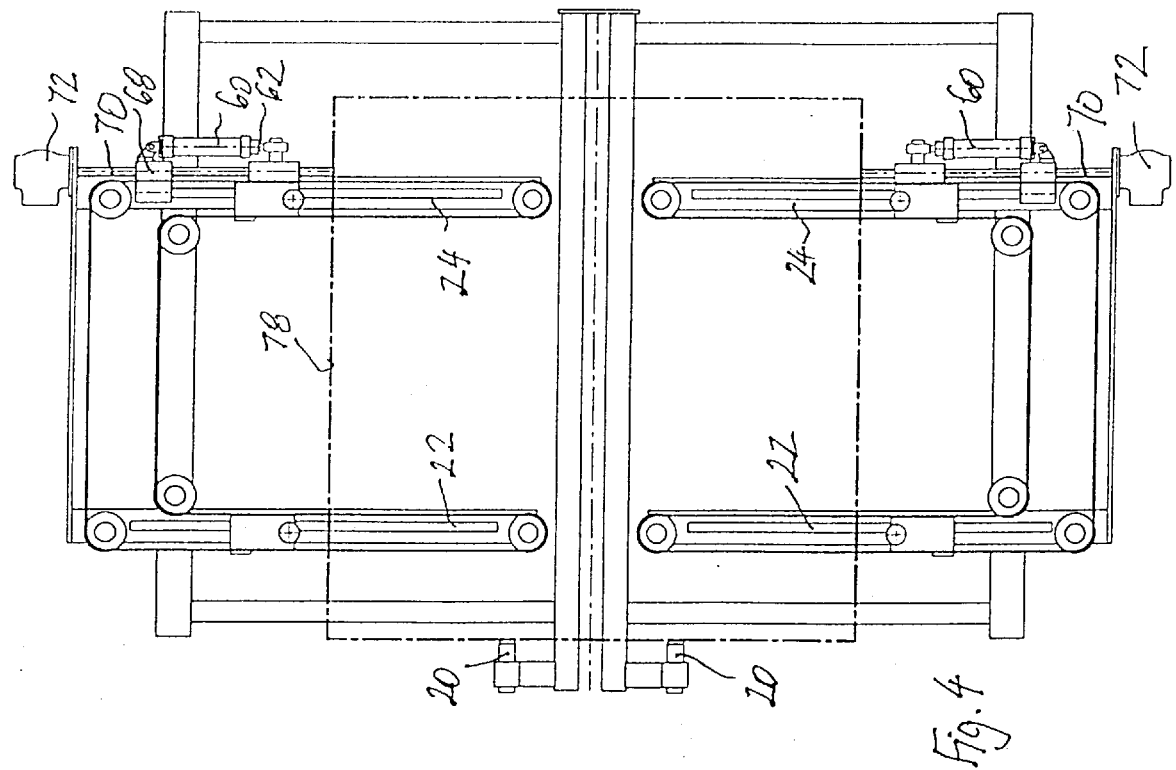

FIGS. 4 and 5 only differ from FIGS. 2 and 3 in that in this case, a workpiece 78 of a considerably larger width is to be centered. The only preparation necessary here is to move adjusting slides 66 of the two pneumatic cylinders 60 a long way outwards, thereby displacing the starting point of the pneumatic drives outwards. In all other respects, the manner of operation is exactly the same as in FIGS. 2 and 3. FIG. 4 shows the stoppers still at a distance from workpiece 78, whilst in FIG. 5 stoppers 48,50 abut against the workpiece and the workpiece is now in its centered position.

Insofar as the embodiment of FIGS. 6 and 7 coincides with the embodiment of FIGS. 1 to 5, corresponding or identical reference numerals have been used in the drawings. No further explanation is considered necessary for these parts. The same reference numbers are also used for the parts disposed on both sides of the center line in a mirror-inverted arrangement; here, too, a repeat explanation is not considered necessary.

FIG. 6 shows a position that can be termed the starting position of the centering process, in which stoppers 48,50, which come into contact with workpiece 76 and push it towards the center, are still at a distance from workpiece 76. In FIG. 7, stoppers 48,50 have come into contact with workpiece 76 and pushed it towards the center.

As in the first embodiment, stoppers 48,50 are disposed on slides 44,46, which can be moved, mounted on guide elements 40,42, perpendicular to the center line 18. Slides 44,46 are fixed to endless traction elements in the form of toothed belts 30. One of the significant differences of the embodiment of FIGS. 6 and 7 compared to the first embodiment is in the different arrangement of these toothed belts 30.

To start with, it can be seen that toothed belt 30 runs diagonally between guide components 40,42 from deflector roller 32 to deflector roller 28 at the end of guide component 42 closest to the center line. This difference with respect to the first embodiment, i.e. the omission of the deflector roller 34 at the outer end of guide component 42 is of no substantial importance. It leads to a certain economy, however, because there is no need for deflector rollers 34, and a shorter toothed belt 30 can be used. Of great importance to the mode of operation, however, is the fact that the toothed belt is led from deflector roller 26 at the inside end of guide component 40 parallel to the center line 18 and around two additional deflector rollers 80,82 bordering against the inside and outside ends of guide track 42 and on to deflector roller 28 on the inside end of guide track 42, as shown in the drawing. In this way a portion 84 of the toothed belt runs parallel to center line 18 on both sides.

The two portions 84 are attached to both sides of a slide 86 which runs on a guide track 88 which lies along the center line 18. To avoid misunderstandings, we wish to point out that all the significant parts of the pusher elements described here are disposed either above or below the plane of movement of workpieces 76, with only stoppers 48,50 projecting into the plane of transport of the workpieces.

Slide 86 can be driven with the aid of a pneumatic cylinder 90 which is supported by an adjusting slide 100.

As in the first embodiment, for the purpose of alignment with the format of the workpiece, the position of this adjusting slide is initially moved to the left or right in FIGS. 6 and 7 by means of a motor 102, which rotates a spindle 104. Once adjusting slide 100 has been moved into a suitable position, pneumatic cylinder 90 only has to execute relatively short movements, as can be seen by comparing FIGS. 6 and 7.

What is claimed is:

1. A centering device for material conveyed on a conveyor system, comprising:
    parallel guide components oriented toward a center line of the conveyor system,
    guide tracks on the guide components,
    an endless traction element threaded to and fro around said guide components,
    pusher elements disposed on opposite sides of the conveyor system such that the pusher elements can be moved to and fro perpendicular to the center line of the conveyor system, said pusher elements including slides which can be moved along the guide tracks on the guide components and which are each connected with the strands of the traction element which are moved in the same direction, and
    said pusher elements each comprise at least two stoppers disposed on the slides, such that said stoppers are driven in the same direction,
    a cylinder drivingly connected with one of the slides for positioning said one of the slides at rest in an adjustable position,
    an adjusting slide which is in contact with the cylinder and which can be moved along the guide track of one of the guide components,
    a spindle which extends parallel to said one of the guide components, and
    a motor which rotates the spindle to move the adjusting slide.

2. A centering device for material conveyed on a conveyor system, comprising:
    parallel guide components oriented toward a center line of the conveyor system,
    an endless traction element threaded to and fro around said guide components,
    pusher elements disposed on opposite sides of the conveyor system such that the pusher elements can be moved to and fro perpendicular to the center line of the conveyor system, said pusher elements each comprise at least two stoppers, said stoppers being connected with said endless traction element such that said stoppers are driven in the same direction,
    deflector rollers at ends of the guide components which are closest to the center line, and
    wherein the traction element runs around the deflector rollers at the ends of the guide components closest to the center line and runs to and fro between rear, outer areas of one guide component and the other guide component.

3. The centering device of claim 2, wherein the traction element is a toothed belt.

4. The centering device of claim 3, wherein:
    the traction element includes two strands that are moved backwards and forwards in the same direction, and
    the stoppers are attached to the two strands.

5. The centering device of claim 2,
    further comprising guide tracks on the guide components, and
    wherein:
        the pusher elements include slides which can be moved along the guide tracks on the guide components and which are each connected with the strands of the traction element which are moved in the same direction, and
        the stoppers are disposed on the slides.

6. The centering device of claim 5, further comprising a cylinder drivingly connected with one of the slides for positioning said one of the slides at rest in an adjustable position.

7. The centering device of claim 6, further comprising an adjusting slide which is in contact with the cylinder and which can be moved along the guide track of one of the guide components.

8. The centering device of claim 5, wherein the cylinder is a pneumatic cylinder.

9. The centering device of claim 3, further comprising guide tracks on the guide components, and
    wherein:
        the pusher elements include slides which can be moved along the guide tracks on the guide components and which are each connected with the strands of the traction element which are moved in the same direction, and
        the stoppers are disposed on the slides.

10. The centering device of claim 4,
    wherein there are two said traction elements associated with the pusher elements and which run parallel to each other along a part section of a length of the traction elements, and
    further comprising:
        a common slide connected with the part sections of the traction elements,
        a cylinder for displacing the common slide, and
        an adjusting slide connected with the cylinder and which comes to rest in an adjustable position.

11. The centering device of claim 2,
    wherein there are two said traction elements associated with the pusher elements and which run parallel to each other along a part section of a length of the traction elements, and
    further comprising:
        a common slide connected with the part sections of the traction elements,
        a cylinder for displacing the common slide, and
        an adjusting slide connected with the cylinder and which comes to rest in an adjustable position.

12. A centering device for material conveyed on a conveyor system, comprising:
    parallel guide components oriented toward a center line of the conveyor system,
    guide tracks on the guide components,
    an endless traction element threaded to and fro around said guide components, wherein the traction element is a toothed belt, and includes two strands that are moved backwards and forwards in the same direction, pusher elements disposed on opposite sides of the conveyor system such that the pusher elements can be moved to and fro perpendicular to the center line of the conveyor system, said pusher elements including slides which can be moved along the guide tracks on the guide components and which are each connected with the strands of the traction element which are moved in the same direction, and said pusher elements each comprise at least two stoppers disposed on the slides, such that said stoppers are driven in the same direction.

13. A centering device for material conveyed on a conveyor system, comprising:

parallel guide components oriented toward a center line of the conveyor system, an endless traction element threaded to and fro around said guide components, wherein the traction element is a toothed belt, pusher elements disposed on opposite sides of the conveyor system such that the pusher elements can be moved to and fro perpendicular to the center line of the conveyor system, said pusher elements each comprise at least two stoppers, said stoppers being connected with said endless traction element such that said stoppers are driven in the same direction, wherein there are two said traction elements associated with the pusher elements and which run parallel to each other along a part section of a length of the traction elements, and further comprising:
a common slide connected with the part sections of the traction elements,
a cylinder for displacing the common slide, and
an adjusting slide connected with the cylinder and which comes to rest in an adjustable position.

14. A centering device for material conveyed on a conveyor system, comprising:

parallel guide components oriented toward a center line of the conveyor system, an endless traction element threaded to and fro around said guide components, pusher elements disposed on opposite sides of the conveyor system such that the pusher elements can be moved to and fro perpendicular to the center line of the conveyor system, said pusher elements each comprise at least two stoppers, said stoppers being connected with said endless traction element such that said stoppers are driven in the same direction, wherein there are two said traction elements associated with the pusher elements and which run parallel to each other along a part section of a length of the traction elements, and further comprising:
a common slide connected with the part sections of the traction elements,
a cylinder for displacing the common slide, and
an adjusting slide connected with the cylinder and which comes to rest in an adjustable position.

15. The centering device of claim 14, further comprising a guide component which runs parallel to the center line and along which the adjusting slide can be moved.

16. The centering device of claim 15, further comprising a spindle drive for adjusting the adjusting slide.

17. The centering device of claim 14, wherein the cylinder is a pneumatic cylinder.

* * * * *